(12) United States Patent
Guy et al.

(10) Patent No.: US 6,643,447 B2
(45) Date of Patent: Nov. 4, 2003

(54) FIBER OPTIC TERMINATOR APPARATUS AND METHOD

(75) Inventors: James K. Guy, Mesa, AZ (US); Donald J. Berg, Mesa, AZ (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/068,019

(22) Filed: Feb. 5, 2002

(65) Prior Publication Data

US 2003/0147618 A1 Aug. 7, 2003

(51) Int. Cl.[7] .................................................. G02B 6/00
(52) U.S. Cl. ...................................................... 385/139
(58) Field of Search ........................ 385/139, 53, 70, 385/78, 134

(56) References Cited

U.S. PATENT DOCUMENTS

| | | | | |
|---|---|---|---|---|
| 4,979,792 A | * | 12/1990 | Weber et al. | 385/53 |
| 4,998,795 A | * | 3/1991 | Bowen et al. | 385/78 |
| 5,746,737 A | * | 5/1998 | Saadat | 606/15 |
| 5,809,198 A | * | 9/1998 | Weber et al. | 385/139 |
| 5,862,289 A | | 1/1999 | Walter et al. | 385/134 |
| 6,104,855 A | * | 8/2000 | Jeon | 385/139 |
| 6,154,597 A | | 11/2000 | Roth | 385/139 |
| 6,230,387 B1 | | 5/2001 | Gritters et al. | 29/566.4 |
| 6,307,997 B1 | | 10/2001 | Walters et al. | 385/134 |
| 6,325,547 B1 | * | 12/2001 | Cammons et al. | 385/76 |
| 6,396,993 B1 | * | 5/2002 | Giebel et al. | 385/136 |
| 6,550,978 B2 | * | 4/2003 | De Marchi | 385/60 |

* cited by examiner

*Primary Examiner*—Lynn Feild
*Assistant Examiner*—Hae Moon Hyeon
(74) *Attorney, Agent, or Firm*—Harness Dickey & Pierce P.L.C.

(57) ABSTRACT

A fiber optic terminator apparatus for terminating unused optical fibers or optical fiber bundles. The apparatus forms a heat sink having two half portions, with each half portion including an involute-shaped cavity. The involute-shaped cavities are further formed as a mirror image pair. The heat sink also includes a bore for receiving an output end of an optical fiber or optical fiber bundle. Optical energy transmitted from the output end is reflected repeatedly between the two mirror image involute-shaped cavities to thus prevent the optical energy from being reflected back into the output end of the optical fiber or optical fiber bundle.

18 Claims, 1 Drawing Sheet

FIBER OPTIC TERMINATOR APPARATUS AND METHOD

FIELD OF THE INVENTION

The present invention relates to fiber optic systems, and more particularly to a terminator for use with optical fibers or optical fiber bundles for terminating optical signals exiting from unused optical fibers or optical fiber bundles.

BACKGROUND OF THE INVENTION

When designing fiber optic illumination systems, there is often a need to either manage extra optical fibers or temporarily manage un-installed optical fibers or optical fiber bundles. The light output from unused optical fibers or optical fiber bundles can be intense enough to cause heat damage to surrounding components if not "capped off". Simply capping off the optical fibers or optical fiber bundles causes light reflection back upstream into the unused optical fiber (or fibers) causing an unnecessary thermal load on the light engine supplying optical energy to the optical fiber (or fibers).

Therefore, there is a need for a method to terminate an unused optical fiber (or unused optical fiber bundle) by minimizing the return path for optical energy emitted from the optical fiber (or fibers) and managing the heat that is created thereby.

There is also a need for an apparatus and method to terminate unused optical fibers in a manner which does not add significant additional cost to the overall fiber optic system and which does not require modification to the optical fibers themselves.

SUMMARY OF THE INVENTION

The above and other objects are provided by a fiber optic terminator apparatus and method in accordance with preferred embodiments of the present invention. In one preferred form, the fiber optic terminator apparatus of the present invention comprises a heat sink having an opening with which an output end of an optical fiber or optical fiber bundle may be placed in communication with. The opening of the heat sink is also in communication with an involute shaped cavity formed within the heat sink. The involute shape is unique in that it is known to create a reflection path where a light ray will never bounce back through the point where it emanated from. Optical energy exiting from the output end of the optical fiber or optical fiber bundle impinges the involute shaped cavity and is reflected away from the output end. In one preferred form the involute shaped cavity is coated with a light absorbing coating, such as flat black paint, to further help absorb optical energy.

In a preferred embodiment the heat sink includes a pair of involute shaped cavities arranged as a mirror image pair. The involute shaped cavities are further arranged with a longitudinal center thereof extending in alignment with a coaxial center of the optical fiber or optical fiber bundle. In this embodiment, both halves of the involute shaped cavity are preferably coated with a light absorbing coating such as flat black paint.

The heat sink of the present invention thus operates to reflect optical energy emitted from an output end of an optical fiber or optical fiber bundle in a plurality of directions within the involute shaped cavity. This serves to more effectively disburse the optical energy throughout the heat sink and, most importantly, to prevent the reflection of optical energy back into the output end of the optical fiber or bundle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
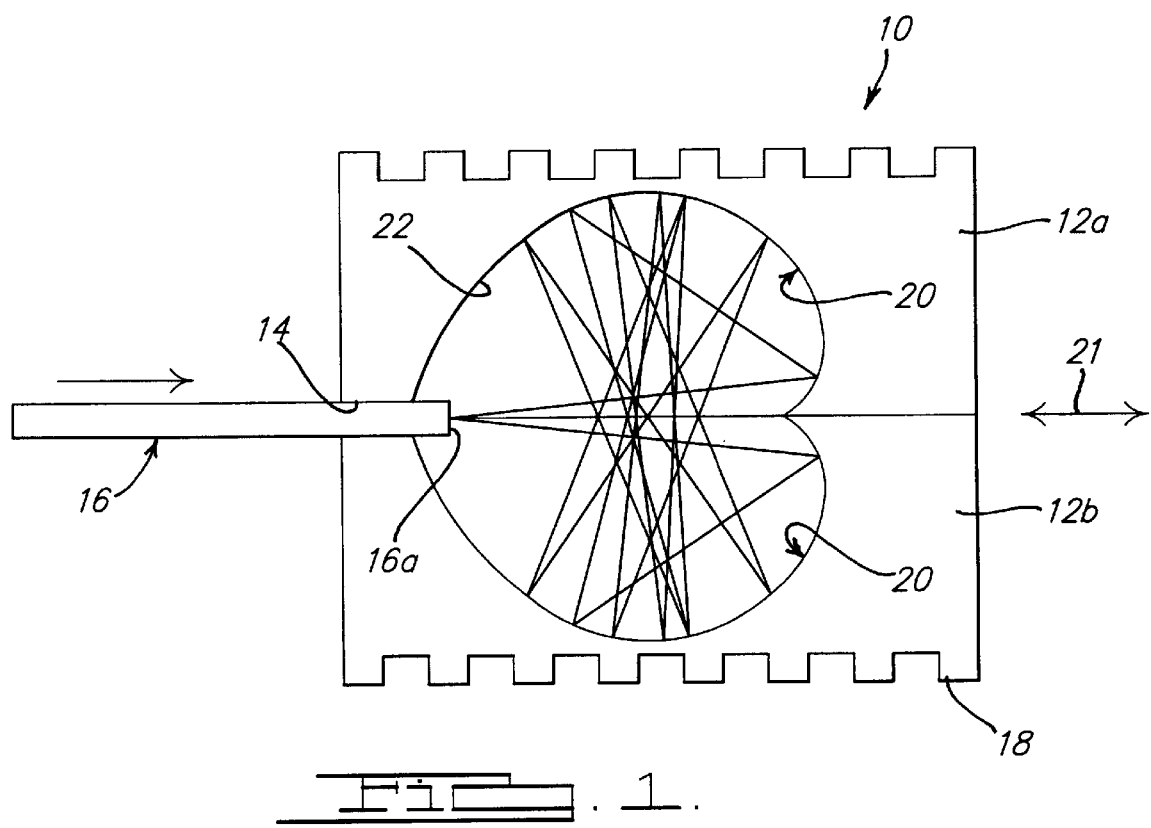
FIG. 1 is a side cross sectional view of a fiber optic terminator apparatus in accordance with a preferred embodiment of the present invention in communication with an output end of an optical fiber or optical fiber bundle.

Referring to FIG. 1, there is shown a fiber optic terminator apparatus in accordance with a preferred embodiment of the present invention. The terminator apparatus comprises a heat sink 10 formed in two halves 12a and 12b. A bore 14 is formed by the two halves 12a and 12b for receiving an end of an optical fiber or optical fiber bundle 16. For convenience, component 16 will be referred to as an optical fiber bundle, although it will be appreciated that the apparatus 10 could be used to terminate a single optical fiber just as easily as a collection of optical fibers (i.e., a "bundle").

The heat sink 10 includes a plurality of fins 18 formed on outer surfaces of each of the two heat sink halves 12a and 12b. Each heat sink half 12a and 12b further includes an involute-shaped cavity 20. Involute shaped cavities 20 are further arranged as a mirror image pair with a central longitudinal axis, defined by arrow 21, being aligned with a coaxial center of the optical fiber bundle 16. In a preferred form the involute shaped cavities 20 are further coated with a light absorbing coating 22. The light absorbing coating may comprise a plurality of materials but in one preferred form comprises flat black paint.

Figure 2:
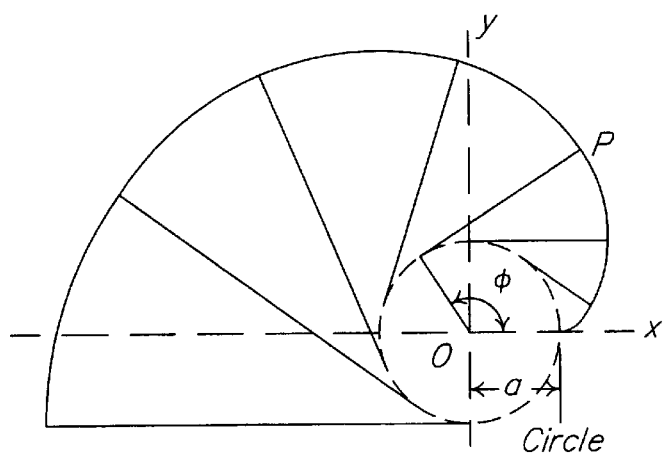
FIG. 2 is an illustration of a circle involute illustrating the creation of an involute from a circle having a given radius "a".

With brief reference to FIG. 2, the involute shape is created in accordance with the following two formulas:

$$X = a(\cos \phi + \phi \sin \phi)$$

$$Y = a(\sin \phi - \phi \cos \phi)$$

The involute-shape is unique in that it creates a reflection path where optical energy will never bounce back through the point where it emanated from. Thus, the involute shape is highly effective for distributing optical energy throughout the heat sink 10, and especially for preventing optical energy from being reflected back into an output end of an optical fiber bundle.

With further reference to FIG. 1, in operation optical energy is transmitted through the optical fiber bundle 16 in the direction of arrow 24. The optical energy impinges the surfaces of the involute-shaped cavities 20 and is reflected repeatedly, in various directions, between the two involute-shaped cavities 20. The optical energy is thus evenly distributed about the surfaces of the two involute-shaped cavities 20, and therefore more evenly throughout each of the heat sink halves 12a and 12b of the heat sink 10. Most importantly, the optical energy is reflected away from an output end 16a of the optical fiber bundle 16 such that optical energy does not re-enter the output end 16a and travel upstream through the optical fiber bundle 16 to the light source (not shown).

The heat sink 10 is preferably formed from a thermally conductive material such as aluminum or another suitably thermally conductive metal. Any suitable means can be employed to hold the heat sink halves 12a and 12b together, such as threaded nut and bolt assemblies extending through suitable holes drilled in the halves 12a and 12b. Suitable adhesives could also be used.

Advantageously, the heat sink 10 does not require modification to the optical fiber bundle 16, does not add significantly to the cost of an overall fiber optic system, and efficiently terminates unused optical fibers or optical fiber bundles in a manner which effectively absorbs unused optical energy therefrom.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A termination apparatus for terminating unused optical fibers to prevent reflection of optical energy transmitted through said optical fibers upstream back into said optical fibers, said apparatus comprising:

a heat sink having an opening for communicating with an output end of an optical fiber; and said heat sink including an involute shaped cavity formed within said heat sink for reflecting optical energy away from said output end of said optical fiber.

2. The apparatus of claim 1, wherein said heat sink comprises a pair of involute shaped cavities arranged as a mirror image pair.

3. The apparatus of claim 1, wherein said heat sink comprises a pair of involute shaped cavities arranged to form a mirror image pair, and with a central longitudinal axis of said mirror image pair coinciding with a coaxial center of said optical fiber.

4. The apparatus of claim 1, wherein said heat sink includes a plurality of heat dissipating fins.

5. A termination apparatus for terminating unused optical fibers to prevent reflection of optical energy transmitted through said optical fibers upstream back into said optical fibers, said apparatus comprising:

a heat sink having an opening for communicating with an output end of an optical fiber;

said heat sink including an involute shaped cavity disposed within said heat sink for reflecting optical energy away from said output end of said optical fiber; and wherein said involute includes an antireflective coating for absorbing said optical energy.

6. The apparatus of claim 5, wherein said heat sink includes a pair of involute shaped cavities disposed in facing relationship to one another for reflecting said optical energy.

7. The apparatus of claim 6, wherein said pair of involute shaped cavities are arranged as a mirror image pair with a longitudinal center aligned with a coaxial center of said optical fiber.

8. The apparatus of claim 5, wherein said heat sink comprises a two piece heat sink.

9. The apparatus of claim 6, wherein said heat sink comprises a two piece heat sink, with each one of said pieces of said heat sink including one of said pair of involute shaped cavities.

10. The apparatus of claim 5, wherein said antireflective coating comprises a layer of flat black paint.

11. A termination apparatus for terminating unused optical fibers to prevent reflection of optical energy transmitted through said optical fibers upstream back into said optical fibers, said apparatus comprising:

a heat sink having an opening for communicating with an output end of an optical fiber; and said heat sink including a hollow internal portion comprising a pair of involute shaped cavities arranged as a mirror image pair, with a central longitudinal axis of said mirror image pair being aligned with a coaxial center of said optical fiber, said involute shaped cavities operating to reflect optical energy received from said output end of said optical fiber away from said output end of said optical fiber to prevent said optical energy exiting said output end from being reflected back into said output end.

12. The apparatus of claim 11, wherein said pair of involute shaped cavities each include an antireflective coating for absorbing said optical energy.

13. The apparatus of claim 12, wherein said antireflective coating comprises a layer of flat black paint.

14. A method for terminating an unused optical fiber to prevent reflection of optical energy exiting from an output end of said optical fiber back into said output end, said method comprising:

placing said output end in communication with an opening in a heat sink, wherein said opening is in communication with an involute shaped cavity formed within said heat sink; and using said involute shaped cavity to reflect said optical energy exiting from said output end of said optical fiber away from said output end.

15. The method of claim 14, further comprising coating said involute shaped cavity with a light absorbing material.

16. The method of claim 15, wherein the step of coating said involute shaped cavity comprises coating said involute shaped cavity with flat black paint.

17. The method of claim 14, wherein the step of placing said output end in communication with said heat sink comprises placing said output end into communication with a pair of involute shaped cavities within said heat sink, wherein said involute shaped cavities are arranged as a mirror image pair on opposite sides of a central longitudinal axis extending through said heat sink, and wherein said central longitudinal axis is aligned with a coaxial center of said optical fiber.

18. The method of claim 14, wherein said step of placing said output end into a heat sink comprises placing said output end into a two piece heat sink.

\* \* \* \* \*